Feb. 23, 1971 D. L. EMMONS ET AL 3,566,280
DIGITAL COMMUNICATIONS CLOCK SYNCHRONIZER FOR RESPONDING TO PULSES OF PREDETERMINED WIDTH AND FURTHER PREDICTABLE PULSES OF SUFFICIENT ENERGY LEVEL DURING PARTICULAR INTERVAL
Filed March 7, 1969
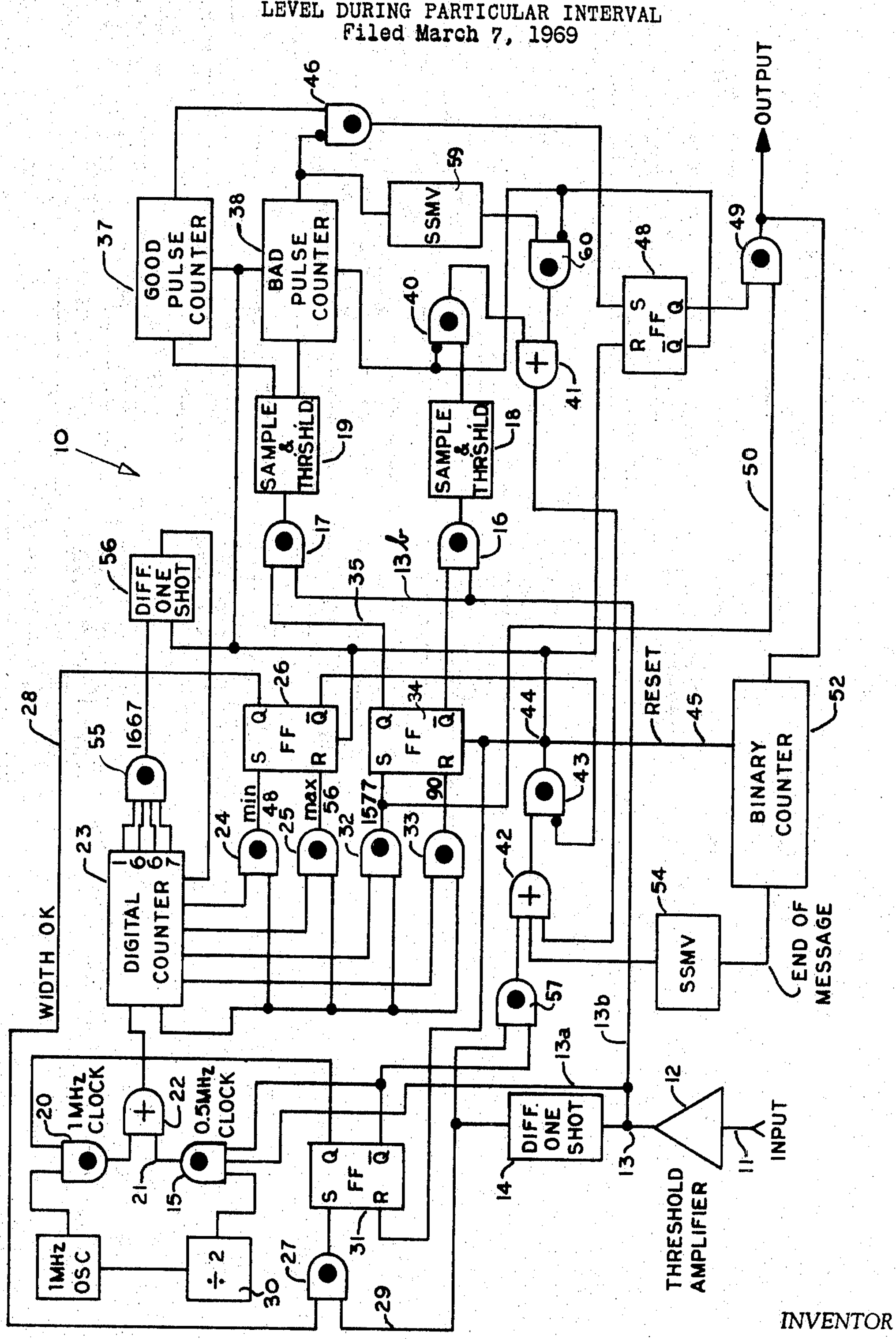
INVENTOR
DAVID L. EMMONS
RUSSEL JAMES BREIDING
BY Julian C. Renfro
ATTORNEY United States Patent Office 3,566,280

Patented Feb. 23, 1971

3,566,280

DIGITAL COMMUNICATIONS CLOCK SYNCHRONIZER FOR RESPONDING TO PULSES OF PREDETERMINED WIDTH AND FURTHER PREDICTABLE PULSES OF SUFFICIENT ENERGY LEVEL DURING PARTICULAR INTERVAL

David L. Emmons, Orlando, and Russel James Breiding, Jr., Winter Park, Fla., assignors to Martin Marietta Corporation, New York, N.Y., a corporation of Maryland Filed Mar. 7, 1969, Ser. No. 805,301
Int. Cl. H03k *1/00, 3/00*
U.S. Cl. 328—63 5 Claims

ABSTRACT OF THE DISCLOSURE

The disclosure is directed to logic apparatus used in conjunction with a digital communications receiver, and employed to establish when correct pulses, known as supervisory pulses, are being received from another communications system or from another unit of the same system. Our device looks for a first pulse of the correct width, and by virtue of being able to predict when subsequent correct pulses would be received, is able to establish if synchronization exists. If it does exist, our device then provides a clock signal to the related digital communications receiver which is then in frequency and in phase with the clock of the other communications unit.

SUMMARY OF THE INVENTION

This invention relates to a synchronizing technique useful for synchronizing digital systems where at least two digital clocks must be operated under phase lock conditions, but without actual phase lock, such as in digital communication receivers.

In the copending patent application of Mills et al. entitled "Radio Telephone System Having Automatic Channel Selection," Ser. No. 540,706, filed Apr. 6, 1966, a communication system suitable for enabling a number of subscribers to communicate in a highly effective manner is described and claimed. The present invention, although it has application outside of that system, is nevertheless a vital part of the type of sequence that must take place before supervisory control can be exercised over a digital system of the type taught by Mills et al.

Our invention is designed to be included in each receiver of a communications system to assure that synchronization is achieved between the two bit clocks, even in the presence of interference, such as noise or interference caused by other subscribers.

Perhaps it would be worthwhile to consider the different types of synchronizers that may be involved in such communications system. These are bit synchronizers, word synchronizers, and message synchronizers. The problem with respect to bit synchronizers is to assure proper alignment between any two clock systems in their respective receivers and transmitter combinations. Bit synchronization, once accomplished, implies that two subscriber systems are operating with clocks at the same frequency and phase. Once it has been determined that bit synchronization has taken place, word synchronization and message synchronization take place by a decoding operation, which is not involved in this invention.

Our invention is based upon the fact that message formats are necessarily known in advance. For example, in the Mills et al. case, the supervisory signal format with respect to bit sync is made up of Gaussian type pulses whose width may be approximately 104 microseconds and whose frequency is 1.667 millisecond, or in other words, occur at a 600 cycle per second repetition rate.

Complicating the problem of aligning two systems with the aforementioned format is the presence of other types of pulses from other subscribers in the same channel, which may be occurring at the same time that bit synchronization should be taking place. Therefore it is necessary to perform more than just the simple task of aligning two interference free formats—it is necessary to determine the energy in the channel at the expected time of arrival of each successive bit sync pulse and determine whether a pulse could exist in the channel at that time or not.

The first assumption made in bit synchronization in accordance with this invention is that within a predetermined length of time, such as 40 milliseconds, an acceptable bit synchronizing pulse free from interference can be found and measured accurately. Once this is accomplished, a digital counter predicts the arrival of the second bit sync pulse being received from the other communication system. It then may be determined that at the expected time of arrival of the second pulse, there is sufficient energy in the channel to assume that a pulse arrived, even though it may have arrived in coincidence with other interference. At the time of the second prediction another measurement is made in the channel of the incident energy. If that energy is sufficient, then a third prediction is generated and so forth up to some predetermined number of predictions. The number of predictions required to assure that bit synchronization is reliably taking place is a function of the degree of interference in the channel.

In the actual operation of this device, the first bit synchronizing pulse which is found free of interference is measured by use of a digital counter, logic gate and flip flop arrangement, with the counter running at one-half operating speed. If the first selected pulse proves to have the proper width, the digital clock and counter arrangement which was used to measure the qualifying properties of the first pulse is caused to double its counting rate by the setting of the flip flop. The changing of the counting speed of the digital counter is equivalent to positioning the first count in the counter in the midpoint of the first supervisory pulse. The counter then continues to count until it reaches a predetermined time interval, which in this case is 1.66 milliseconds minus one-half of the expected width of the second pulse, at which time a logic "window" is opened for the second pulse. During this expected time of arrival of the second supervisory pulse, an integrator dynamically sums the energy arriving during this "window." If the energy in the integrator at the closing of the "window" is above the minimum level of energy which would represent the arrival of a supervisory pulse, a secondary counter, called the good pulse counter, records the fact that one supervisory pulse in addition to the first pulse has been received at the expected time of arrival. Meanwhile, the digital counter continues to count at the rate of 600 cycles per second and generates 1.66 milliseconds later another "window" which predicts the time of arrival of a subsequent supervisory pulse relative to the second pulse. The aforementioned integrator is again allowed to integrate the energy in the channel and if the energy again goes above a predetermined threshold, a second good pulse arrival is recorded by the good pulse counter. In the event that during any expected time of arrival the energy in the channel as measured by the integrator circuit does not meet the predetermined level, a bad pulse counter records the failure of a good pulse to arrive. The good pulse counter and the bad pulse counter are so arranged to form a ratio of good pulse arrivals to pulses that should have arrived but did not over a predetermined number of expected times of arrival. If a predetermined number of good pulses arrive within a given time interval, a flip flop is set which indicates that bit synchronization has been assumed. In the event that too many failures occur, then according to a prearranged ratio of good pulses to bad pulses, a reset function is generated, which commands the bit synchronizer to resume searching the channel for another proper first supervisory pulse.

As should therefore be apparent, we have provided a bit synchronizer that performs a statistical study of the energy in a communication channel with respect to time and then determines that a proper format pattern with respect to time has been or has not been received.

It is an object of this invention to provide a circuit capable of performing a highly satisfactory timing of the internal reference clock of the circuit with respect to an incoming signal.

It is another object of our invention to align the repetition rate of a cyclic digital counter, which is part of a bit synchronizer, with the repetition rate of an incoming supervisory signal.

It is still another object of this invention to provide a circuit to exclude pulses not meeting a width criteria.

It is yet another object to perform a statistical study of the pulses arriving during an expected time of arrival, in order to provide a reliable indication that proper bit synchronization between two communication units has taken place.

Other objects, features and advantages of this invention will be more apparent from a study of the enclosed drawing.

The single drawing figure is a block diagram of the bit synchronizer of the invention.

DETAILED DESCRIPTION

As shown in the drawing, our bit synchronizer 10 is equipped with an input 11 that is to be connected to a device having pulse type outputs, such as to the second detector of a related digital communication receiver (not shown), which is to be synced to one or more remotely located digital devices. Threshold amplifier 12 is directly connected to the input lead so that it can threshold detect the incoming pulses at their fifty percent amplitude points. It should be noted with regard to the input on lead 11 that the receiver with which our device may be used is typically equipped with an AGC arrangement such that all pulses (including disturbances) on lead 11 are 1 volt in amplitude. Threshold amplifier 12 is basically a high gain operational amplifier which is operated open loop and referenced to a stable 0.5 volt source.

The output from threshold amplifier 12 to terminal 13 is essentially a rectangular pulse whose width is therefore equal to the width of the aforementioned incoming pulses measured at their 50% amplitude points. From terminal 13, the pulses are fed to differentiating one shot 14 whose function is to provide to gates 27 and 57 a narrow pulse corresponding to the trailing edge of any pulse it receives. Pulses appearing at terminal 13 are also fed on lead 13*a* to AND gate 15, and on lead 13*b* to AND gates 16 and 17.

Other inputs to AND gate 15 are from a divide-by-two counter 30, and from the $\overline{Q}$ output of flip flop 31, this latter device being a set-reset flip flop whose outputs on terminals Q and $\overline{Q}$ are complementary. As will be apparent to those skilled in the art, when there is a reset input to terminal R of flip flop 31, this causes terminal Q to be a logical zero and terminal $\overline{Q}$ is to be logical 1. On the other hand, in the instance of a set pulse supplied by a gate 27 to terminal S, the flip flop 31 will during such interval provide a 1 output on terminal Q, and terminal $\overline{Q}$ assumes a zero state. Inasmuch as terminal $\overline{Q}$ is connected to 0.5 megahertz clock 15 and terminal Q is connected to 1 megahertz clock 20, the type of output from flip flop 31 determines whether gate 15 or gate 20 is enabled, thus allowing the square wave emanating from the 1 megahertz oscillator 39 to reach the digital counter 23 through the divide-by-two counter 30 and the 0.5 mHz. clock 15, or on occasion from the 1 mHz. clock 20. This arrangement involves a time measurement based upon the characteristics of the first pulse of acceptable width, and more details will be apparent as the description proceeds.

Thus, the AND gate 15 has three inputs, the input connected to lead 13*a*, the input from the $\overline{Q}$ output of the flip flop 31, and a half megahertz input from the divide-by-two counter 30, but by design this gate has no output unless the aforementioned inputs are simultaneously received. This arrangement means that during the time the flip flop 31 is in its normal or "reset" state, AND gate 15 is passing the half megahertz pulses during the occurrence of any incoming pulses on lead 13*a*, and gate 57 concerned with reset is enabled. Such incoming pulses (including disturbances) are of course the output of threshold amplifier 12, and include the supervisory bit sync pulses with which this circuit is primarily concerned. When a first supervisory bit sync pulse is in fact received, the AND gate 20 is enabled and gate 57 disabled, as will be hereinafter discussed in detail.

Output 21 from the AND gate 15, as well as the output from gate 20 are connected through OR gate 22 to the digital counter 23, this latter device being a three decade digital counter connected to provide a 600 cycle per second cyclic rate. This rate is brought about by the fact that certain outputs of the counter are connected to a decoding AND gate 55 that detects the occurrence of a 1667 count, which for a 1 megahertz counting rate is the period of 600 cycles per second. Differentiating one shot 56 is connected to the output of gate 55 and generates a narrow pulse each time at the count of 1667, which output is connected back to cause the digital counter 23 to be reset and to continue counting from count zero and to repeat at the 600 cycle per second cyclic rate. It should be noted that 600 cycle per second rate of digital counter 23 is selected because the predetermined supervisory signal format is a Gaussian pulse wave form whose repetition rate is established at 600 cycles per second. Therefore, the incoming pulses from the second detector of the particular receiver with which our invention may be used will occur at a 600 cycle per second rate if they are bona fide supervisory signals. Obviously, we are not to be limited to a 600 cycle per second rate, and the counter 23 could be arranged to operate at a different rate if so required by the system. For example, we could employ rates from 500 microseconds to 860 microseconds, or within the spirit and scope of this invention we could have an arrangement in which the operating rate could be programmed over 40 microsecond intervals between the above-mentioned low and high rates.

The digital counter 23 is used in conjunction with two decoding mechanisms, one involving it being connected to AND gates 24 and 25, which in turn connect to flip flop 26, and the other involving being connected to AND gates 32 and 33, which in turn connect to flip flop 34. The first decoder arrangement is used exclusively for measuring and detecting the occurrence of a first acceptable pulse, and the second decoder arrangement is used for generating an expected time of arrival function and its complement. These will be described more fully hereinafter.

In order that our bit synchronizer can determine if an incoming pulse meets the established width criteria of a supervisory pulse of say 104 microseconds (plus or minus 8 microseconds) measured at its 50% amplitude point, the digital counter 23 is started through 0.5 mHz. clock 15 at the leading edge of every incoming disturbance (i.e. pulse), with the digital counter thus counting at half speed. At a count of 48, the decoding AND gate 27 is caused to set flip flop 26, which means that the flip flop 26 is placed in the set condition 96 microseconds after the arrival of the leading edge, considering the fact that 48 counts at a half-megacycle rate is equivalent to 96 microseconds. This amounts to an enabling function appearing at terminal Q and therefore on lead 28, which may be regarded as the width OK signal for enabling gate 27. At a count of 56, decoding AND gate 25 causes the flip flop 26 to be reset, which means that 112 microseconds after the arrival of the leading edge of the incoming pulse, the gate 27 is again disabled. Thus, the AND gate 27 is then responsive to inputs on lead 29 from the differentiating one shot 14 for the period between 96 and 112 microseconds, which represents the "window" or period during which the trailing edge of a pulse of acceptable width (i.e. good pulse) should arrive.

As mentioned before, differentiating one shot 14 generates a narrow pulse at the trailing edge of each pulse (disturbance) appearing at terminal 13, and furnishes this narrow pulse to AND gate 27, as well as to AND gate 57. Thus, if this narrow pulse occurs during the time AND gate 27 is enabled, the output from gate 27 serves to set flip flop 31 such that its complementary outputs operating AND gates 20 and 15 are reversed, thus causing the gate 20 to be enabled, and the output of OR gate 22 to now furnish a 1 megahertz clock signal to digital counter 23, instead of the previous one-half megacycle clock signal. This of course causes the digital counter 23 to resume its normal counting rate and continue to count toward the first 1667 count, after the reaching of which the digital counter 23 commences to recycle at a 600 cycle per second rate.

It is most significant for the reader to note that by counter 23 changing from half speed to full speed at the time of arrival of the trailing edge of the first acceptable pulse, and therefore counting toward the next pulse at twice the rate used to measure the first pulse, this has effectively placed the first pulse of the 1667 count in the precise center of the first incoming pulse, thus allowing a very accurate estimate of the occurrence of the center of the second acceptable pulse with respect to time to be made. As should be obvious, the center of the second pulse cannot be predicted until the center of the first pulse has been accurately ascertained, and as just described, we have by this procedure started an accurate alignment process which leads to the utlimate synchronization of two digital communication systems.

Because of the importance of this technique to this invention, it should be repeated that the first acceptable pulse by definition has a width at the 50% amplitude point of between 96 and 112 microseconds, with it being important that the precise midpoint of such pulse be located after the determination as to the correct width. This is accomplished, as just explained, by measuring the width of the first pulse using two microsecond intervals between clock pulses and causing this interval to go to one microsecond at the trailing edge of the first pulse that is of acceptable width. Thus it will be seen that at the trailing edge of the first acceptable pulse, the digital counter 23 will have recorded the occurrence of 48 to 56 counts, which at 2 microseconds per count accurately represents the centroid of the pulse rather than its leading edge, as would have happened had the counting rate of the counter not been changed. The foregoing pulse width and window width are of course to be taken as illustrative, and we are not to be limited thereto.

It should be remembered that the narrow pulse outputs from differentiating one shot 14 are connected to gates 27 and 57 such that the occurrence of an enabling pulse on lead 28 from flip flop 26 allows the output from gate 27 to set flip flop 31, which in turn disables gate 57. Alternatively, the occurrence of a narrow pulse output from differentiating one shot 14 at times other than when the enabling function is present on lead 28 will cause system reset. This is due to the fact that flip flop 31, when the disturbance at hand does not meet the width criteria, is in the reset condition, which means that the $\overline{Q}$ output from flip flop 31 is enabling gate 57 so that the narrow pulse outputs from differentiating one shot 14 representing the trailing edges of non-acceptable pulses go through it and OR gate 42 to AND gate 43, which is the reset driver. Inputs to gate 43 go through to terminal or point 44, which is the reset line. Thus a pulse at point 44 serves to reset all flip flops and all counters of our device.

The function of the second decoder arrangement comprising AND gates 32 and 33 and flip flop 34 is to predict the expected time of arrival of the second and subsequent acceptable pulses. The complementary outputs Q and $\overline{Q}$ of flip flop 34 representing the expected time of arrival of latter pulses and the complement of these expected times of arrival are connected respectively to AND gates 17 and 16. As an example, we can arrange gate 32 to be enabled on count 1577, and thus to cause the set condition of flip flop 34 at that time, so that an output on its output terminal Q will enable gate 17, and so that gate 16 will be disabled. At that time gate 17 can pass thresholded pulses from amplifier 12 that are supplied on lead 13*b*.

It should be noted that a count of 1577 represents a $T_0$ minus 90 clock pulses, inasmuch as the counter 23 in this illustrative embodiment is cycling about a 1667 pulse count. Gate 33 is enabled on count 90 ($T_0$ plus 90) to cause reset of flip flop 34, thus again disabling gate 17. Thus a second "window" or time of arrival function has been created, in this instance having a width of 180 microseconds. This is ample width for acceptable bit sync pulses, which in this system may be from 104 microseconds to 120 microseconds wide at their 50% amplitude points.

An output of AND gate 17 representing the coincidence of the output of threshold amplifier 12 during the expected time of arrival provided by the Q output of flip flop 34 is integrated and threshold detected by sample and threshold circuit 19. The output of latter device is connected to good pulse counter 37, which records the arrival of energy exceeding a predetermined threshold during the expected time of arrival, and to bad pulse counter 38, which records the failure of the energy in the channel during the expected time of arrival to reach the threshold. The $\overline{Q}$ output of flip flop 34 is connected to gate 16 to disable it during this period.

Good pulse counter 37 and bad pulse counter 38 are arranged to provide with AND gate 46 a ratio detecting function. If good pulse counter 37 reaches a predetermined count of acceptable pulses before bad pulse counter 38 reaches a predetermined count of non-acceptable pulses, AND gate 46 causes flip flop 48 to be set. The output on the Q terminal of flip flop 48 is used to enable gate 49, so that it can pass the 600 cycle per second pulses appearing on lead 50 from gate 32. On the other hand, the occurrence of a greater output ratio from bad pulse counter 38 than good pulse counter 37 causes gate 46 to be inhibited, and in addition, causes single shot multivibrator 59 to cause the system to be reset by means of gates 60, 41, 42 and 43.

The setting of flip flop 48 by the signal at gate 46 thus records the receiving of more acceptable pulses by the system than non-acceptable pulses, and this represents the decision to accept bit sync. Furthermore, this decision to accept bit sync as represented by the Q output of flip flop 48 being set to a high level allows 1 microsecond pulses occurring at a 600 cycle per second rate to be furnished from counter 23 via lead 50 to the affiliated communication receiver, for example. A typical number might be 150 pulses.

Binary counter 52 is connected to the output lead of our device to record this predetermined number of pulses and its output, referred to as end-of-message signal, is in turn connected to cause single shot multivibrator 54 to reset the entire bit synchronizer through gates 42 and 43. This function is important because it provides a limited operation with respect to time and allows the bit synchronizer to resume its normal search function after a proper time for a digital message has elapsed.

It should be noted that the occurrence of a supervisory pulse at times other than the expected time of arrival is monitored by AND gate 16, which as previously mentioned, is connected to terminal 13 by lead 13*b*. Gate 16 is enabled by the $\overline{Q}$ output of flip flop 34, and its outputs to sample and threshold circuit 18 cause our bit synchronizer to be reset by gates 40, 41, 42 and 43, if an otherwise proper supervisory pulse occurs outside the expected time of arrival.

It is perhaps in order to tabulate the several conditions under which resetting of our system takes place:

(1) Failure of the system to accept any disturbance or pulse as a "first" pulse. This occurs by the differentiating one shot 14 furnishing a pulse to AND gate 27 at the trailing edge of the disturbances, which in every instance happens outside of the width OK signal formed on lead 28 by flip flop 26, and furnished to AND gate 27 for setting flip flop 31.

One output of differentiating one shot 14 is connected to AND gate 57, which is always enabled by flip flop 31 if no "first" pulse is accepted. Gate 57 is connected through OR gate 42 and AND gate 43 to reset line 44. AND gate 43 allows the system reset to occur at all times except during the width OK signal formed by decoder 24, 25 and 26, at which time flop flop 26 is in the set condition.

(2) The second reset source is the occurrence of a certain number of unacceptable pulses before a number of acceptable pulses. In this case, bad pulse counter 38 causes single shot multivibrator 59 to generate a pulse which is connected to AND gate 60 and thence through OR gates 41 and 42 to gate 43, which furnishes the system with its reset. However, it should be noted that if flip flop 48 gets sets by a number of good pulses first, AND gate 60 is inhibited by the $\overline{Q}$ output from flip flop 48, thus to prevent reset.

(3) The third mode of reset is involved if a pulse of proper width occurs outside of the expected time of arrival. Gate 16 is enabled at times that gate 17 is disabled, and gate 16 is in turn connected to sample and threshold 18. AND gate 40 senses the occurrence of this condition by its relation to sample and threshold 18, and gate 40 is in turn connected to OR gates 41 and 42, and to AND gate 43 which forms the reset signal at terminal 44. This arrangement results in sync being rejected if a supervisory pulse is passed by gate 16, which means that such pulse is necessarily out of sync with those being passed by gate 17. This arrangement is not mandatory, but usually we do not wish our device to be attempting to establish sync with two different remote systems at the same time.

(4) The fourth and last mode of reset occurs when the binary counter 52 has counted more than a reasonable number of 600 cycle clock pulses, and accordingly, by prearrangement, an end of message signal is generated and furnished by single shot multivibrator 54 to OR gate 42 and AND 43, which furnishes the reset at 44.

As should now be apparent, the principal operation of our bit synchronizer is as follows:

The digital counter 23 is started for every disturbance received at input 11, this taking place through threshold amplifier 12, terminal 13, lead 13*a*, gate 15, and gate 22 to the input terminal of the digital counter. Because this route is through the 0.5 mHz. clock 15, the counter 23 runs at one-half the speed of one mHz. source 39. The counter is reset after each disturbance that is not of the width of the bit synchronizer pulse being sought, inasmuch as differentiating one shot 14 supplies a pulse corresponding to the trailing edge of every incoming pulse, which passes through normally enabled gate 57, OR gate 42 and AND gate 43 to the terminal 44 concerned with reset. It is only when a "first" pulse of acceptable width has been received that the flip flop 31 is set so as to disable gate 57, this taking place as a result of the incoming pulse being of a width sufficient to pass through the "window" created by decoder 24–26, which decoder creates a width OK signal on lead 28 that serves to enable gate 27 for a pre-established period. Thereafter, when differentiating one shot 14 supplies a pulse corresponding to the trailing edge of this "first" pulse, it passes through now-enabled gate 27 and sets the flip flop 31, the $\overline{Q}$ output of which disables gate 57 to prevent system reset and disables clock 15. The Q output of the flip flop 31 enables 1 mHz. clock 20 so that the digital counter 23 can be caused to resume full speed operation.

In accordance with this invention we provide a predicted time of arrival function in the form of a decoder 32–34 that creates a "window" at gate 17. This window, significantly, is located based upon information derived by knowing the centroid location of the "first" pulse, which of course was derived as previously explained by the doubling of the speed counter 23 when the first pulse of acceptable width has been received. This window is amply large to allow an acceptable "second" pulse and subsequent "good" pulses on lead 13*b* to pass through gate 17, but not so large as to allow pulses not occurring in a correct time relationship to the first acceptable pulse to pass.

As previously mentioned, the counters 37 and 38 in conjunction with gate 46 form a decision making arrangement that requires a larger ratio of pulses of sufficient energy to the pulses of insufficient energy, and only if the ratio of acceptable pulses is larger is gate 46 enabled so that it can cause flip flop 48 to be set. The Q output from flip flop 48 enables gate 49, and this in effect is the accept sync decision. Our device now furnishes on lead 50 and to the output terminal, one microsecond pulses whose repetition rate is 600 cycles per second. These one microsecond pulses are furnished as clock pulses to the related piece of digital equipment, which pulses are in fact synchronized with the remote equipment from which the supervisory pulses were received.

It should be noted that our device will operate with better than 95% success in the face of interference 20 db above the desired supervisory signals, and with greater than 90% success with interference at 30 db. Our unit is adaptable to various desired pulse widths and will maintain the same interference immunity in all instances, provided the ratio of undesired to desired pulses remain as stated.

We claim:

1. A device for establishing synchronization between two or more pieces of digital equipment comprising an input means, means connected to said input means for establishing if a first pulse of a plurality of pulses received from a remote piece of digital equipment is of a pre-established width, means for predicting the arrival times from the remote equipment of second and subsequent pulses based upon information derived from the first pulse, and means for making a decision to accept sync only if for a given time interval the number of pulses having a pre-established energy level and arriving at the predicted time exceeds the number of pulses received during that interval and having an insufficient energy level.

2. The device as defined in claim 1 in which reset means are provided for resetting the device and commencing a new search for a first pulse in the event the number of pulses of insufficient energy exceeds the number of pulses having sufficient energy.

3. A device usable with related digital equipment for establishing synchronization with a remote piece of digital equipment comprising input means arranged to receive pulses from such remote equipment, means connected to said input means and being responsive to the leading edge of incoming pulses, said means then functioning to predict the arrival time of the trailing edge of a first pulse of acceptable width, means functioning upon finding a first pulse of acceptable width for predicting the arrival times of second and subsequent pulses of acceptable width, decision means for establishing the existence of synchronization between the two pieces of digital equipment based upon the receipt of more acceptable pulses than non-acceptable pulses within a given time period, and means for then supplying pulses at the proper clock rate to the related piece of digital equipment.

4. The device defined in claim 3 in which a digital counter is utilized, said counter being arranged to operate at half normal speed until a pulse of acceptable width has been received, and then arranged to resume normal speed, such operation in effect enabling measurement from the centroid of the first acceptable pulse, and thus making possible an accurate prediction of the time of arrival of second and subsequent pulses based upon the centroid information rather than upon the location of the leading or trailing edge of the first pulse.

5. The system as defined in accordance with claim 3 in which reset means are provided for rejecting sync and restarting the search for a first acceptable pulse upon more non-acceptable pulses than acceptable pulses being received within a given time period.

References Cited

UNITED STATES PATENTS 3,020,483 2/1962 Losee ____________ 178—69.5X
3,209,265 9/1965 Baker et al. __________ 328—63
3,407,356 10/1968 Meranda ___________ 328—63X

OTHER REFERENCES

Pub. I: "Receiver Synchronization for Data Transmission," in IBM Tech. Disclosure Bulletin, vol. 10, No. 8, January 1968, pp. 1320–1321.

STANLEY D. MILLER, Jr., Primary Examiner

U.S. Cl. X.R.

178—69.5; 307—269; 328—72, 111, 155